(12) United States Patent
Watanabe et al.

(10) Patent No.: US 7,243,441 B2
(45) Date of Patent: Jul. 17, 2007

(54) METHOD AND APPARATUS FOR MEASURING DEPTH OF HOLES FORMED ON A SPECIMEN

(75) Inventors: Masahiro Watanabe, Yokohama (JP); Takenori Hirose, Machida (JP); Yukio Kembo, Tokyo (JP); Yoshiyuki Nagano, Tsuchiura (JP); Takafumi Morimoto, Kashiwa (JP)

(73) Assignee: Hitachi Kenki Fine Tech Co., Ltd., Tokyo (JP)

( * ) Notice: Subject to any disclaimer, the term of this patent is extended or adjusted under 35 U.S.C. 154(b) by 4 days.

(21) Appl. No.: 10/986,878

(22) Filed: Nov. 15, 2004

(65) Prior Publication Data

US 2005/0183282 A1    Aug. 25, 2005

(30) Foreign Application Priority Data

Nov. 14, 2003    (JP) ............................. 2003-384818

(51) Int. Cl.
   *G01B 5/00*    (2006.01)

(52) U.S. Cl. ............................. 33/836; 33/546; 33/554; 702/167

(58) Field of Classification Search .................. 33/836, 33/542, 546, 547, 548, 549, 551, 553, 554, 33/533; 702/167; 257/758–766; 438/622, 438/629, 637–641; 324/691, 716, 719, 765
See application file for complete search history.

(56) References Cited

U.S. PATENT DOCUMENTS

| | | | |
|---|---|---|---|
| 490,860 A | * | 1/1893 | Snoeck ........................ 33/836 |
| 4,265,022 A | * | 5/1981 | Noguchi et al. ............... 33/553 |
| 4,516,326 A | * | 5/1985 | Calcagno, Jr. ................ 33/836 |
| 5,321,894 A | * | 6/1994 | Bury ............................ 33/553 |
| 5,736,457 A | * | 4/1998 | Zhao .......................... 438/624 |
| 5,747,380 A | * | 5/1998 | Yu et al. ...................... 438/599 |
| 5,970,621 A | * | 10/1999 | Bazydola et al. .............. 33/533 |
| 6,047,479 A | * | 4/2000 | Galestien ...................... 33/553 |
| 6,067,720 A | * | 5/2000 | Heilbronner et al. .......... 33/553 |
| 6,284,642 B1 | * | 9/2001 | Liu et al. ..................... 438/622 |
| 6,333,558 B1 | * | 12/2001 | Hasegawa .................... 438/624 |
| 6,516,528 B1 | * | 2/2003 | Choo et al. ................... 33/551 |
| 2003/0212523 A1 | * | 11/2003 | Dorough et al. ............ 702/119 |

FOREIGN PATENT DOCUMENTS

| | | | | |
|---|---|---|---|---|
| JP | 60105908 A | * | 6/1985 |
| JP | 60247103 A | * | 12/1985 |
| JP | 61114117 A | * | 5/1986 |
| JP | 2000-009437 | | 1/2000 |

* cited by examiner

*Primary Examiner*—Richard Smith
*Assistant Examiner*—Travis Reis
(74) *Attorney, Agent, or Firm*—Antonelli, Terry, Stout & Kraus, LLP.

(57) ABSTRACT

A method an apparatus for measuring the depths of many fine holes formed in the surface of a sample by etching. Positional information on a plurality of hole patterns is acquired by scanning, with a stylus, the surface of the sample in which the hole patterns are formed by etching. The depths of the plurality of hole patterns are measured by scanning, with the stylus, bottom faces of the plurality of hole patterns and the surface of the sample in the respective vicinities of the hole patterns on the basis of the positional information that has been acquired. Information on distribution of the depths of the plurality of hole patterns is displayed on a screen on the basis of information on the measured depths of the plurality of hole patterns and the positional information on each of the hole patterns.

4 Claims, 16 Drawing Sheets

METHOD AND APPARATUS FOR MEASURING DEPTH OF HOLES FORMED ON A SPECIMEN

CLAIM Of PRIORITY

The present application claims priority from Japanese application Ser. No. 2003-384818, filed on (Nov. 14, 2003), the content of which is hereby incorporated by reference into this application.

BACKGROUND OF THE INVENTION

The present invention relates to a method by which the conditions are established for the etching step in a manufacturing process of semiconductor devices or thin film magnetic heads, for instance, in particular the step of forming holes for inter-layer connection or the etching step of forming holes known as contact holes, via holes or through holes can ensure stable conduction and a method of performing periodic condition checkups (quality control: QC), a device therefor and a machining method for semiconductor devices using this condition setting method.

In recent years, as holes for inter-layer connection are increasingly reduced in diameter and raised in aspect ratio along with the use of ever finer patterns, the need is rising for measuring techniques which can ensure accurate establishment of conditions for the hole etching step and performance of periodic condition checkups (quality control: QC) in a reduced number of man-hours. Whereas dry etching typically including plasma etching and wet etching using an etching solution are generally known, dry etching is mainly used for fine machining.

According to the prior art, regarding establishment of the conditions of the etching step and performance of periodic condition checkups (quality control: QC), in particular the step of forming holes for inter-layer connection or the etching step of forming holes known as contact holes, via holes or through holes, there is no method of direct nondestructive measurement, and measurement is carried out by one or another of the following methods.

One method is to perform confirmation of conduction electrically by using a dedicated test element group (TEG) wafer in which a probing pad is formed by arranging holes for inter-layer connection in a chain form. This method requires measurement of resistances after the formation of under layer wiring, holes for inter-layer connection and upper layer wiring, and accordingly the TEG wafer for use in the measurement has to go though many steps for checking up the conditions of etching to form holes for inter-layer connection, resulting in an extra cost and length of time. If any problem is found, a section of the holes for inter-layer connection should be cut out with a focused ion beam (FIB) or the like to be observed and analyzed through a scanning electron microscope (SEM) or otherwise, which also is time consuming and costly.

For the routine monitoring of deviations from etcher conditions (quality control: QC), either the TEG cited above is used, or a line-and-space test pattern is formed by etching, and the level gaps in this pattern are measured with a stylus profiler or an atomic force microscope (AFM). Another known method is optical CD (OCD) by which the scattering of light by a line-and-space test pattern is measured and the three-dimensional shape parameters are estimated. However, since the test pattern is not a hole pattern, the etching pattern is offset, and this offset has to be compensated for, making it impossible to directly confirm the etching conditions of holes.

Also, regarding the conditions of etching to form holes, it is essential to make sure that the holes formed in the insulator layer reach the wiring pattern layer of the under layer. For instance, the Japanese Patent Application Laid-Open No. 2000-9437 discloses a method to optically measure the thickness of an insulator layer formed over a wiring pattern or the like, but this disclosure proposes nothing regarding a method to check and measure whether or not the holes have reached the under layer.

By still another method, the conduction or non-conduction of holes for inter-layer connection is detected according to differences in voltage contrast when the etched object is irradiated with an electron beam. Although this method permits detection of high resistances, there is no way to assess how much extra etching is done over the minimum required etching depth (a state of over-etching) at the time of conduction. What is essentially desired to be known is, when holes for inter-layer connection 102 are bored into an under layer wiring layer 101 in the insulator layer 100, whether the holes penetrate the wiring layer 101 neither too much nor too little to achieve an appropriate over-etched state 102a, they do not reach the wiring layer 101 in a non-conducting state 102b or there is a state of excessive over-etch 102c as shown in the sectional view of FIG. 2. Even if only the whole depth d is measured with a stylus profiler, it is impossible to know how the under layer 101 is etched or not etched because the depth of the insulator layer 100 varies.

Whereas a semiconductor device uses many hole patterns, known as via holes, contact holes or through holes, to establish electrical connection between a conducting under layer and a wiring layer above with an insulator layer in-between, the establishment of the conditions for etching to bore these holes can be achieved only by determination of a good or faulty state according to voltage contrast under irradiation with an electron beam or a destructive test with a sectional SEM, but there is no nondestructive way of quantitative evaluation of the state of etching.

SUMMARY OF THE INVENTION

According to the invention, the surface shape of a sample is measured by scanning with a stylus the surface of the sample in which hole patterns are formed by etching to acquire positional information on a plurality of hole patterns, the depths of the plurality of hole patterns are measured by scanning with the stylus the surface of the sample on the bottom faces of the plurality of hole patterns and in the respective vicinities of the hole patterns on the basis of the positional information; and information on the distribution of the depths of the plurality of hole patterns on the sample is displayed on a screen on the basis of the information on the measured plurality of hole patterns and the positional information on the respective hole patterns.

According to the invention, the over-etched state of a conductor pattern formed underneath the hole patterns may be measured by measuring the depths of the plurality of hole patterns, and information on the over-etched state of the plurality of hole patterns on the sample displayed on the screen on the basis of positional on each of the hole patterns.

According to the invention, an apparatus for measuring the surface shape of a sample includes table means which, mounted with a sample in whose surface many fine holes are formed, can move in a plane; profiling means for measuring the depths of the holes formed in the surface of the sample by bringing a stylus into contact with the surface of the sample mounted on the table means; driving means for driving the profiling means to cause the stylus to scan the surface of the sample; processing means for acquiring information on the distribution of many fine holes in the surface of the sample by driving the profiling means with the driving means to process information on the respective positions and depths of the many fine holes formed in the surface of the sample obtained from the profiling means having scanned the surface of the sample; and display means for displaying in a map form the state of distribution of the depths of the many fine holes formed in the surface of the sample obtained by processing with the processing means.

According to the invention, the processing means may figure out states of over-etching the conductor pattern from information on the depth of the many hole patterns measured by the profiling means; and the display means may display, in a map form on the screen, information figured out by the processing means on the distribution of the over-etched states of the many hole patterns in the sample on the basis of positional information on each of the many hole patterns.

According to the invention, the film thickness and the over-etching quantity of the inter-layer insulator layer can be measured merely by measuring the level gap with a stylus, making it possible to rapidly establish the conditions for the etching of via holes and the like and to perform QC more frequently. Furthermore, combination of resistance measurement with a stylus and thickness measurement of the inter-layer insulator layer with a thickness gauge enables the etched state of via holes to be known in more detail.

These and other objects, features and advantages of the invention will become more apparent the following more detailed description of preferred embodiments of the invention, as illustrated in the accompanying drawings.

DESCRIPTION OF THE PREFERRED EMBODIMENTS

Preferred embodiments of the present invention will be described below in more specific detail with reference to the accompanying drawings.

Embodiment 1

Figure 1A:
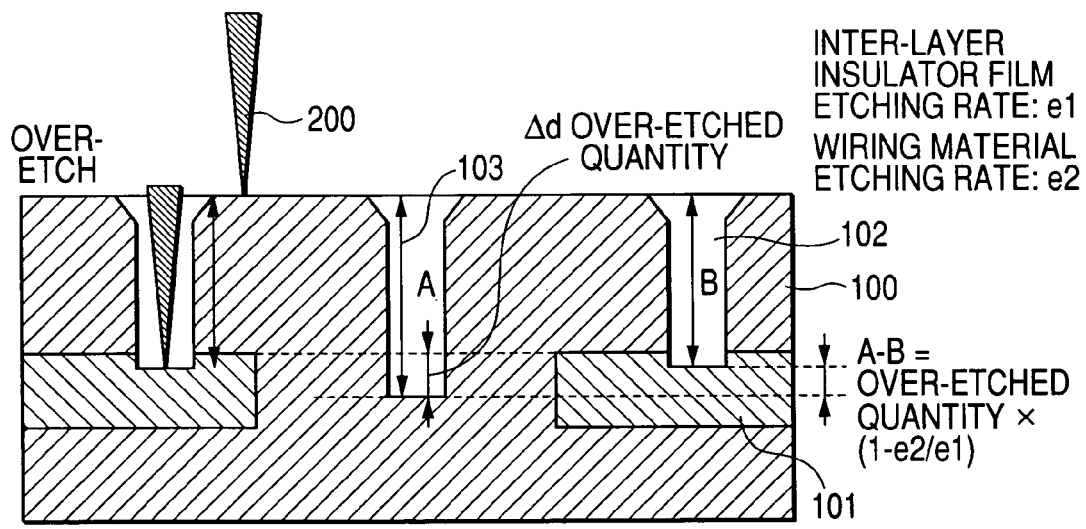
FIG. 1(a) is a sectional diagram of a pattern used in measuring the state in which holes for inter-layer connection, which constitute Embodiment 1 of the present invention, are etched, showing a state of over-etching
Figure 1B:
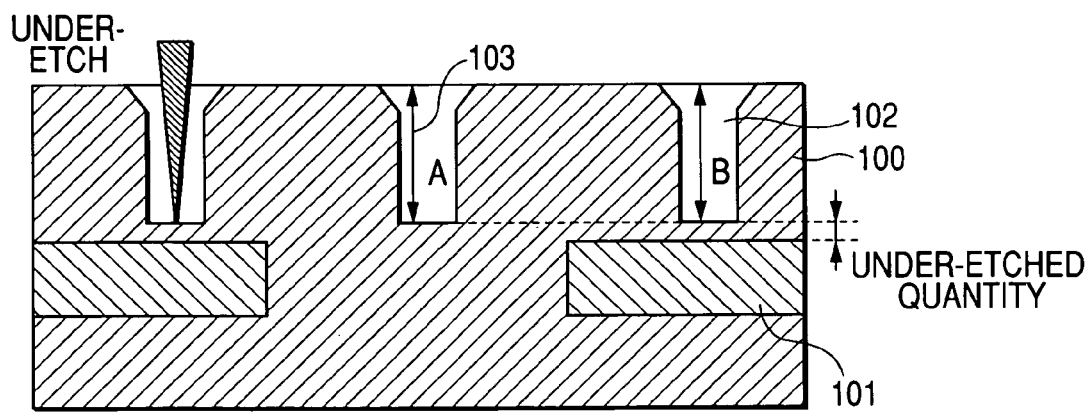
FIG. 1(b) is a state in which the same section of the pattern is under-etched.
Figure 2:
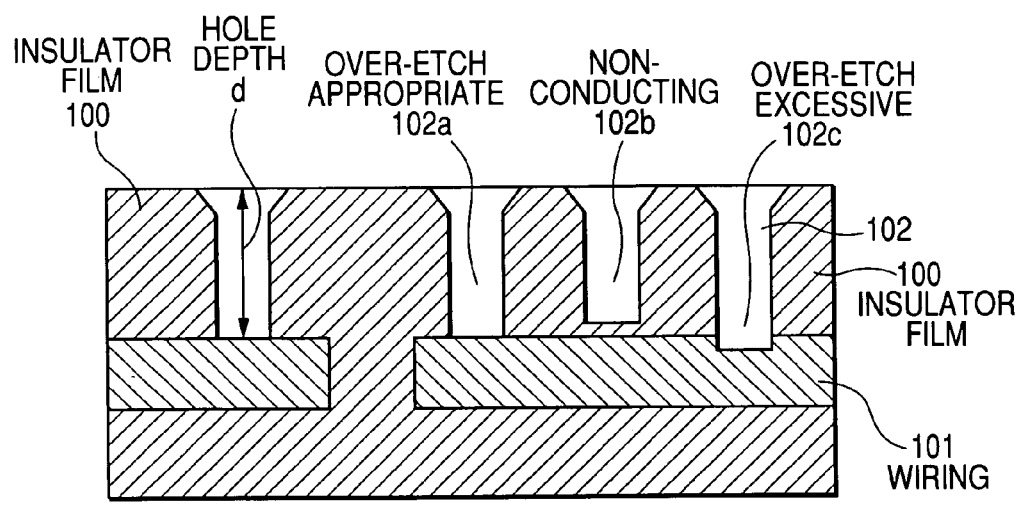
FIG. 2 illustrates a section of the state in which the holes for inter-layer connection to be measured are etched.

A pattern and a measuring method used in the invention will be described with reference to FIG. 1. A dummy hole 103 is bored adjoining a hole pattern 102 etched toward a wiring layer 101 where there is no wiring layer pattern. This can be transferred to a resist by using a prepared exposure mask on which such a pattern is formed as will be described afterwards with reference to Embodiment 6, or directly transferred to a resist by using an electron beam.

After etching this pattern by a known dry etching technique, it is scanned with a stylus profiler or an atomic force microscope (AFM) to be described with reference to FIG. 9. Obviously, any other scanning probe microscope (SPM) capable of measuring the depth of a level gap, such as a near field scanning optical microscope (NFOM) or a scanning tunnel microscope (STM), can be used to constitute the invention.

The depth of each hole can be accurately measured from the difference in the height of its bottom and that of its circumference. Here in the over-etched state shown in FIG.

1(a), the relationship of the following equation holds between the depth A of the dummy hole 103 and the depth B of the regular hole 102:

$$A-B = \text{Over-etched quantity } (\Delta d) \times (1-e2/e1)$$

where e1 is the etching rate of an inter-layer insulator layer 100 and e2 is that of the wiring layer 101. By using this equation, the over-etched quantity Δd can be quantitatively measured. In the under-etched state shown in FIG. 1(b), A=B holds, and accordingly the under-etched quantity cannot be measured, but the etcher conditions should be set to a slightly over-etched state for stable etching of holes for inter-layer connection, and there will be no problem if the over-etched quantity can be measured to enable conduction to be ensured even if there are fluctuations.

Incidentally, although the foregoing description presupposes that reference numeral 101 denotes the wiring layer and 100, the insulator layer, it holds true irrespective of the materials of the wiring layer 101 and the insulator layer 100 only if the etching rate of the wiring layer 101, known as a stopper layer, is smaller than that of the insulator layer 100.

Now, the stylus profiler or the atomic force microscope (AFM) to be used in the invention will be described with reference to one example of AFM configuration shown in FIG. 9.

A cantilever 207 having a stylus 200 with a pointed tip formed at its one end is fitted to a fine motion Z axis 209 and a fine motion XY axis 208. The axes 208 and 209 are usually configured of piezoelectric elements whose deformation quantities can be controlled with an applied voltage, but other driving elements, such as voice coil motors, may be used as well. The displacement quantity may be measured with a displacement sensor (not shown).

A sample 150, mounted on an XYZ coarse motion stage 204, is held within the moving range of the cantilever 207. The state of contact between the stylus 200 and the sample 150 is monitored by an overall control system console 201, and the height of the cantilever 207 is controlled by a Z axis control line 202 on the basis of the monitored result. Whereas the state of contact is measured according to the bending amount and the state of bending vibration of the cantilever 207, this is accomplished by using a strain gauge fitted to the cantilever or a laser interferometer or by measuring with a spot position sensor 205 the beam reflected from the tip of the cantilever irradiated with a beam from a laser 206 as shown in FIG. 9.

The above-described operation is performed while scanning the relative positions of the sample 150 and the stylus 200 in the XY direction by using the XY axis 208 or the XYZ coarse motion stage 204, and the height profile data of the sample 150 are stored into and displayed on the overall control system console 201 by recording the Z axis 209 then.

Where the stylus profiler is used, usually the fine motion Z axis 209 is absent, and the bending of the stylus 200 when holding the cantilever 207 at a certain height is detected with a differential transformer or the like to obtain as a height profile the variations in the bending during XY scanning.

Figure 7:
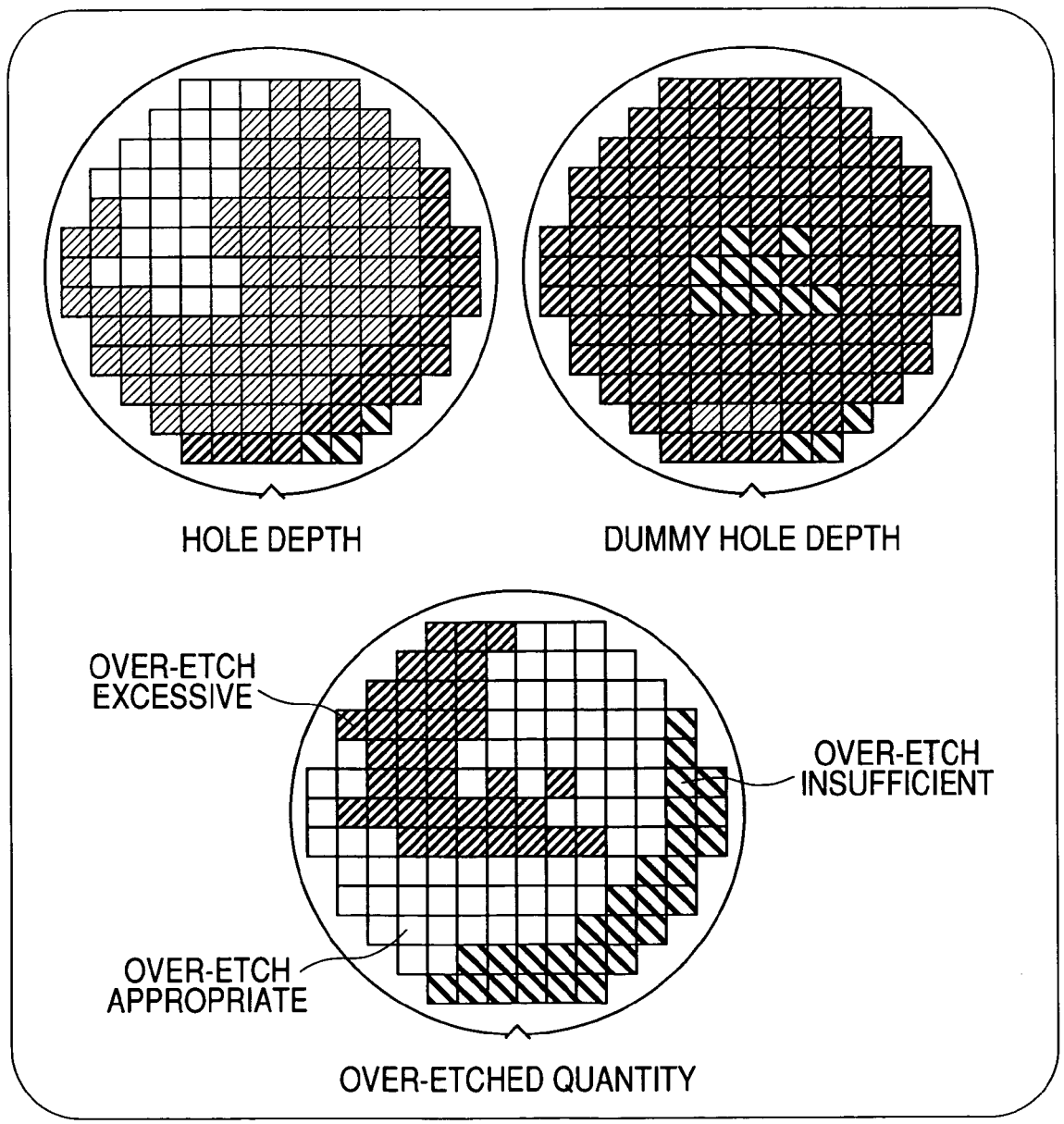
FIG. 7 is an example of GUI drawing regarding the measurement of the over-etched quantity by a dummy pattern proposed herein, which constitutes Embodiment 1 of the invention.

Next, an example of display on the overall control system console 201 will be described with reference to FIG. 7. As illustrated, the distribution of hole depths in the wafer over the under layer pattern (the wiring layer pattern 101) and the distribution of hole depths in the wafer where the under layer pattern is absent are displayed, contrasted by differences in gradation. Further, the over-etched quantity Δd is calculated from these differences, and the distribution in the wafer is displayed on that basis.

This makes visually perceptible the distributions of the film thickness of the insulator layer 100 and of the over-etched quantity, and the distribution of the film thickness of the insulator layer makes possible effective feedbacks to the conditions of the depositing step, plating step and polishing (CMP) step in forming the insulator layer film. The distribution of the over-etched quantity can be effectively utilized for correcting unevenness in the distribution of the etched quantity by varying the etching conditions or preventing an area insufficient in over-etching from occurring by adjusting the duration of etching.

Figure 12:
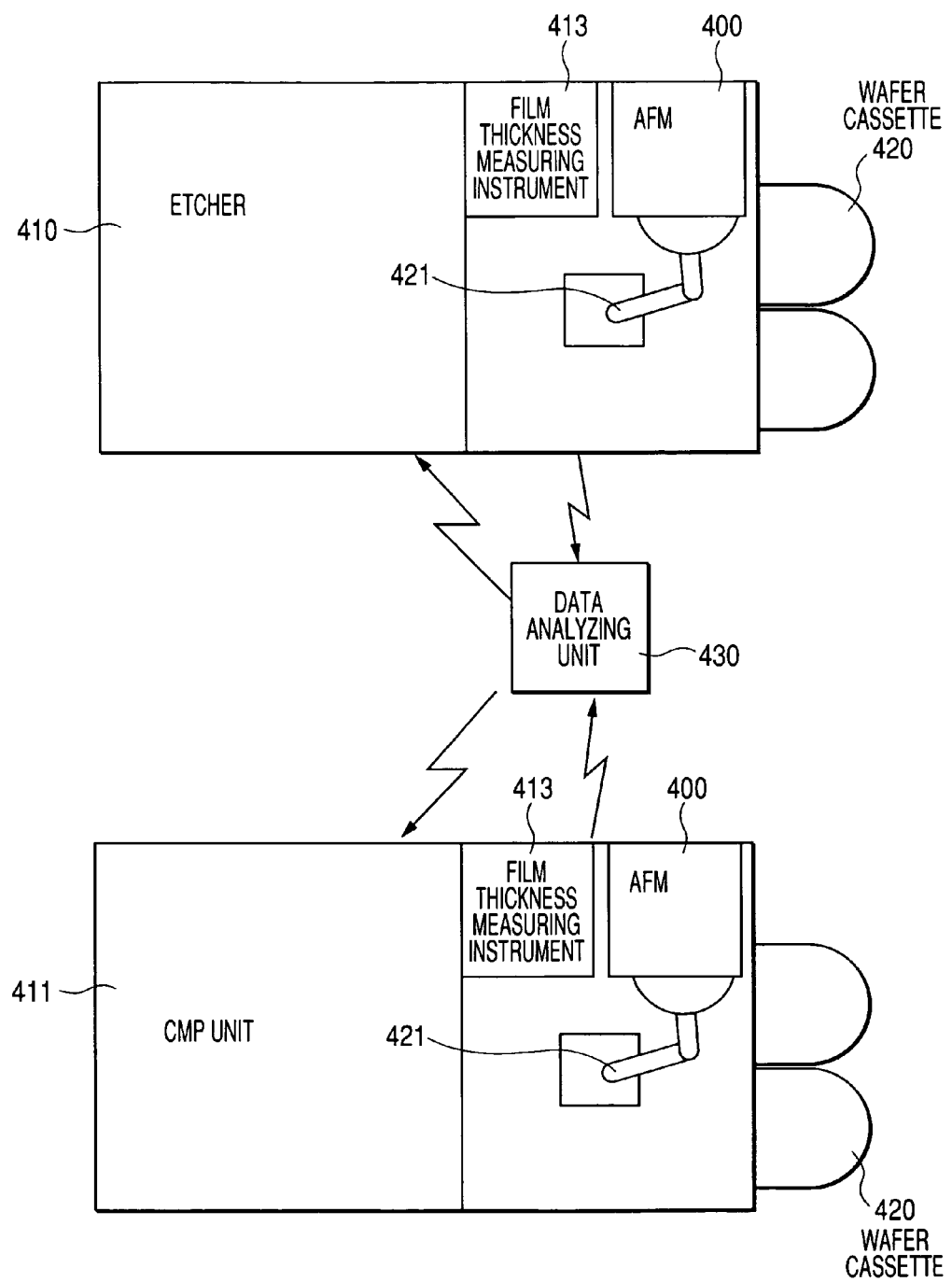
FIG. 12 illustrates measurement of the state of inter-layer connection hole etching and the device configuration needed for its process feedback, which constitutes Embodiment 4 of the invention.

Incidentally, this display can be performed not only on the console on the AFM or the profiler, but may as well be on a separate data analyzing unit 430, into which measurement data are transferred by communication or others as will be described afterwards with reference to FIG. 12. This is also true of other examples of displaying to be described with reference to FIG. 6 and FIG. 8.

Embodiment 2

Figure 3:
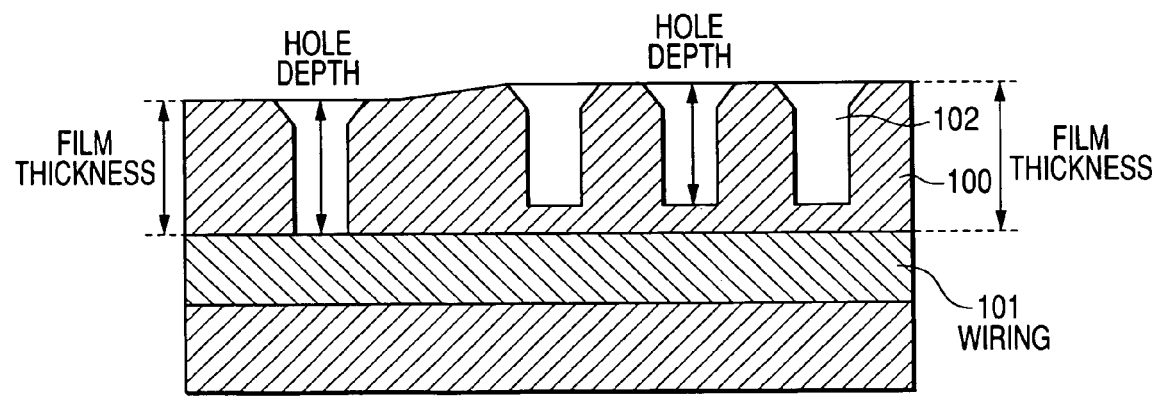
FIG. 3 is a sectional view illustrating a method of measuring the state of inter-layer connection hole etching by the combined use of measuring the hole depth and the film thickness, which constitutes Embodiment 2 of the invention.

Combined use with a film thickness gauge will now be described with reference to FIG. 3. As illustrated in this drawing, if the thickness of the insulator layer 100 and the depth d of the holes 102 in each area are known, it can be determined whether or not a given hole has reached the wiring layer 101, how far it is from reaching it or whether or not the film is excessively etched.

The hole depth d can be determined by measuring the height of its bottom and that of its circumference with the AFM or the profiler described with reference to FIG. 9, and calculating the difference between them. The film thickness of the insulator layer 100 can be measured with an optical film thickness gauge to be described with reference to FIG. 10. In the optical film thickness gauge, as described in the Japanese Patent Application Laid-Open No. 2000-9437 for instance, a light beam from a light source 234 is brought to incidence on an objective lens 233 via an illuminating lens 235 and a half mirror 236 to irradiate a sample 233.

The reflected beam is guided to a spectral system 230 via the objective lens 233, the half mirror 236 and an iris aperture 237 to measure the distribution of luminous energy for each wavelength, from which a spectral reflectance is determined with film thickness measuring means 231, and the film thickness is estimated from the mathematical model of the spectral reflectance due to film interference. A part of the reflected beam from the sample 150 is reflected by the half mirror 236 and guided to a camera 232 through a zoom-lens 238 as to form a magnified image of the sample 150. The signal of the magnified image is transferred to the control system console 201 for observing the sample 150.

The above-described operation is performed while scanning the relative positions of the sample 150 and the objective lens 233 in the XY direction with an XY axis control system 203 using the XYZ coarse motion stage 204, and the film thickness distribution data of the sample 150 are stored into and displayed on the overall control system console 201 by recording the thickness then.

To add, it is to be noted that, although the foregoing description presupposes that reference numeral 101 denotes the wiring layer and 100, the insulator layer, it holds true irrespective of the materials of the wiring layer 101 and the insulator layer 100 only if the wiring layer 101 is a layer of a material whose depth can be measured with a film thickness gauge.

Figure 6:
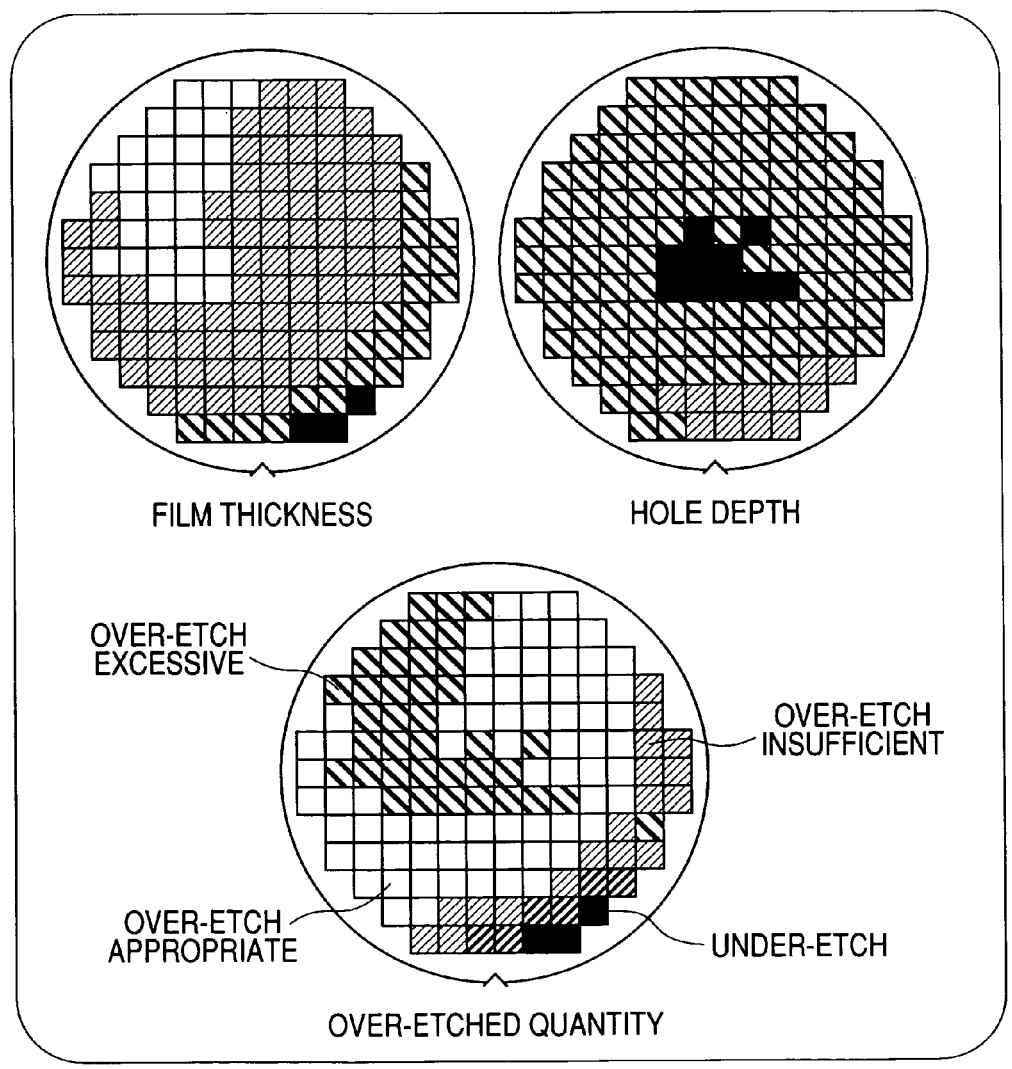
FIG. 6 is an example of GUI drawing regarding the measurement of the state of inter-layer connection hole etching by the combined use of measuring the hole depth and the film thickness, which constitutes Embodiment 2 of the invention.

Next, an example of display on the overall control system console 201 will be described with reference to FIG. 6. As illustrated, the distribution of hole depths in the wafer and the distribution of hole depths in the wafer are displayed, contrasted by differences in gradation. Further, the over-etched quantity and the under-etched quantity are calculated from these quantities, and their distributions in the wafer are displayed.

This makes visually perceptible the distributions of the film thickness of the insulator layer and of the over-etched quantity, and the distribution of the film thickness of the insulator layer makes possible effective feedbacks to the conditions of the depositing step, plating step and polishing (CMP) step in forming the insulator layer film. Also, the distribution of the over-etched quantity can be effectively utilized for correcting unevenness in the distribution of the etched quantity by varying the etching conditions or preventing an area insufficient in over-etching from occurring by adjusting the duration of etching.

Figure 4A:
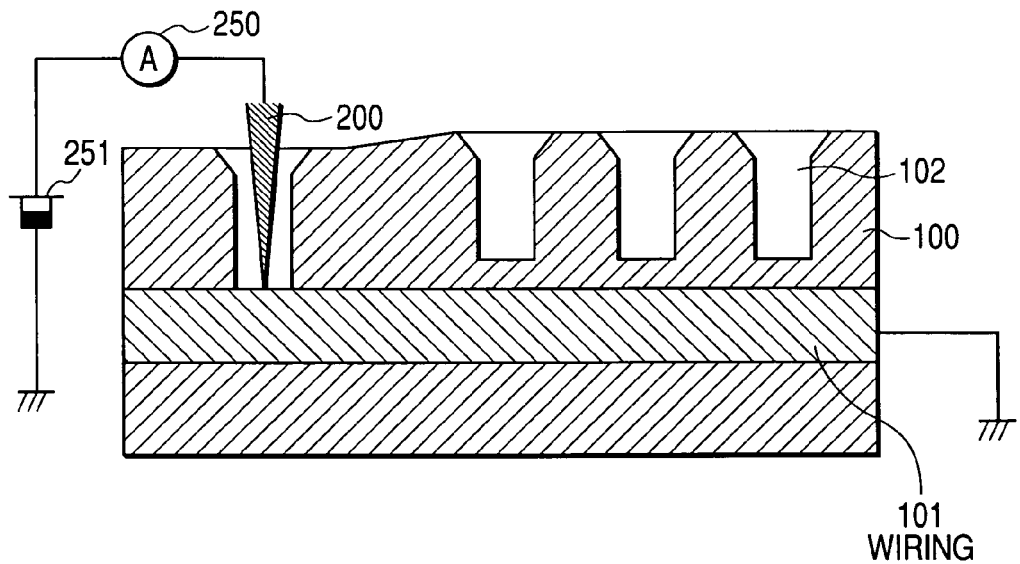
FIG. 4(a) is a sectional view of holes for inter-layer connection illustrating a method of applying a DC voltage to a stylus and measuring the current that flows in Embodiment 3 of the invention and FIG. 4(b) is a sectional view of holes for inter-layer connection illustrating a method of applying an AC voltage to a stylus and measuring the current that flows in Embodiment 3 of the invention.
Figure 4B:
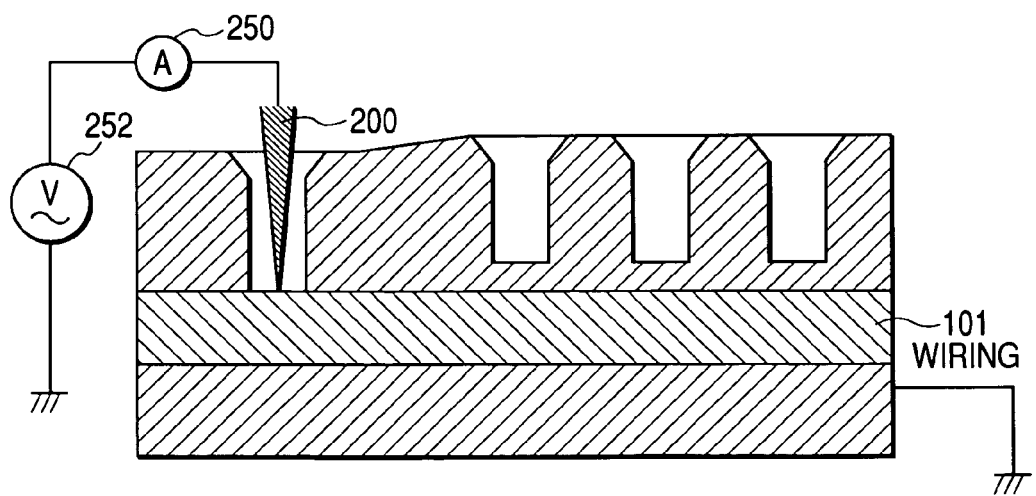
Figure 5:
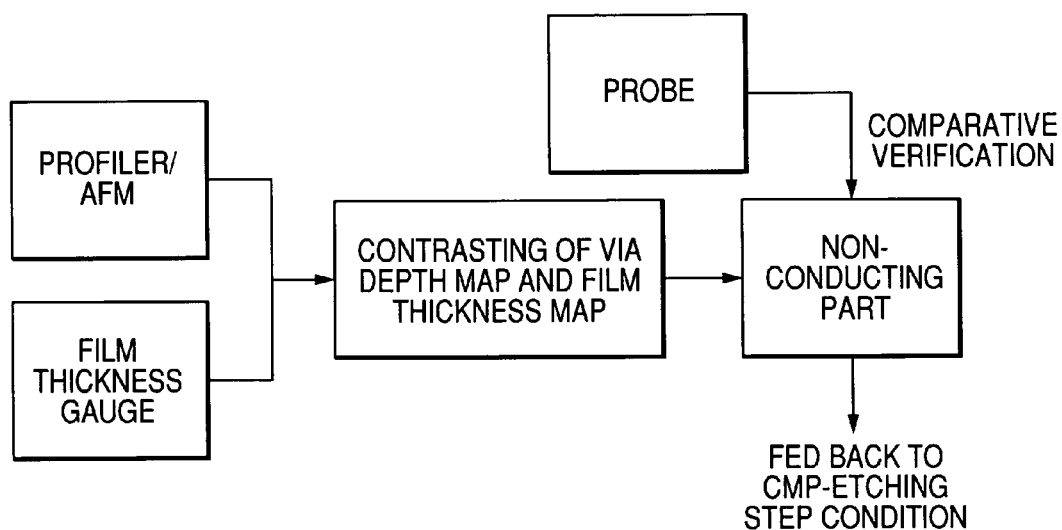
FIG. 5 illustrates the process feedback of the result of measuring the state of inter-layer connection hole etching by the combined use of measuring the hole depth and the film thickness, which constitutes Embodiment 2 of the invention.

Further, more secure feedback to the process conditions is made possible by verifying the distribution of non-conducting portions expected to the calculated distribution of the over-etched quantity in comparison with the resistance measurement with a prober using the test element group (TEG) pattern as shown in FIG. 5, and thereby obtaining corrected data regarding the measurement offsets of the film thickness and of the hole depth. Or, the resistances of the hole bottoms can as well be measured directly at the time of measuring the profile with a stylus as will be described afterwards with reference to FIG. 4.

Embodiment 3

Next, an embodiment of the invention in a case where directly measured resistances of hole depths are used in combination will be described with reference to FIG. 4 and FIG. 9. When the height profile of the sample 150 is measured with the system illustrated in FIG. 9, the current flowing as a result of applying a DC voltage 251 to the stylus 200 as shown in FIG. 4(a) is measured with an ammeter 250. Where direct grounding from the wiring layer 101 is impossible, an AC voltage 252 can as well be applied as shown in FIG. 4(b), and the resultant current can be detected with the ammeter 250.

Figure 9:
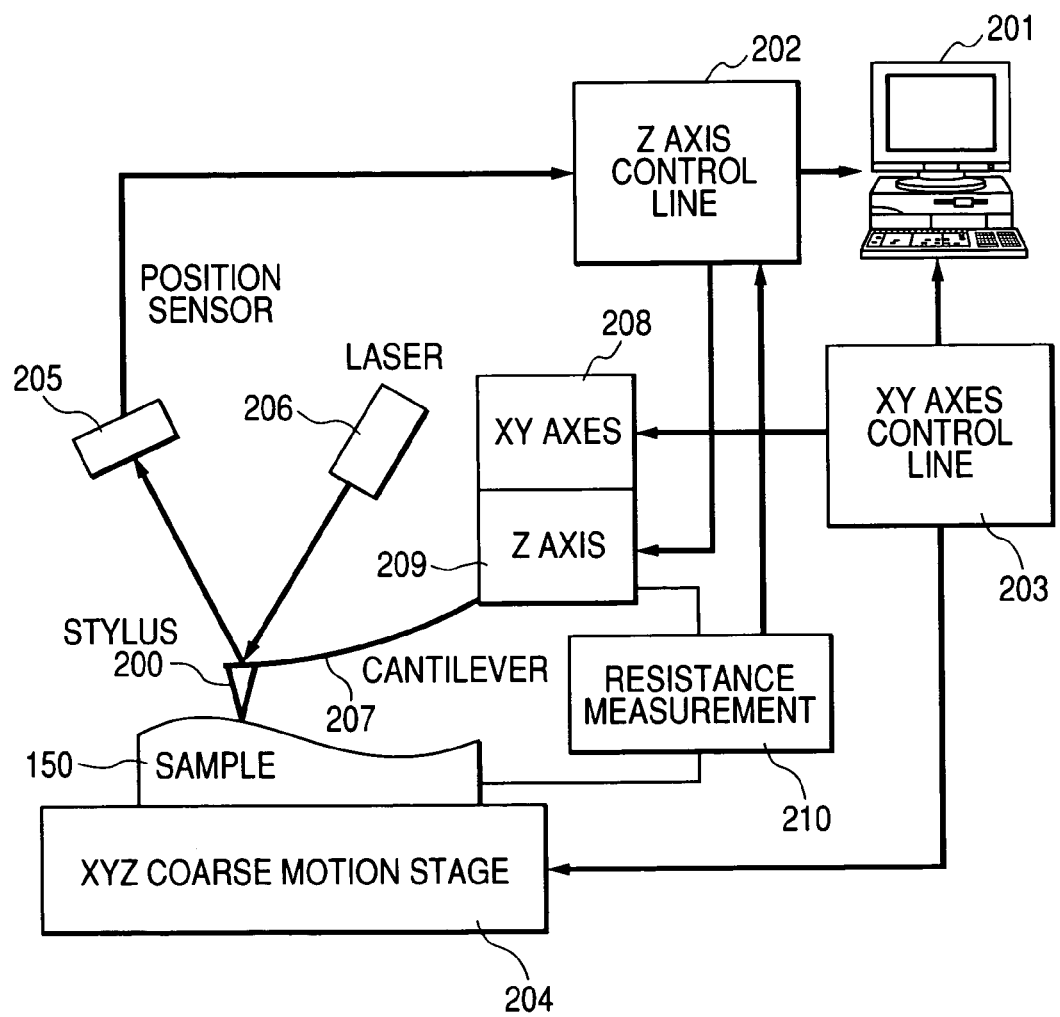
FIG. 9 shows a configuration of an atomic force microscope to be used in the invention.
Figure 10:
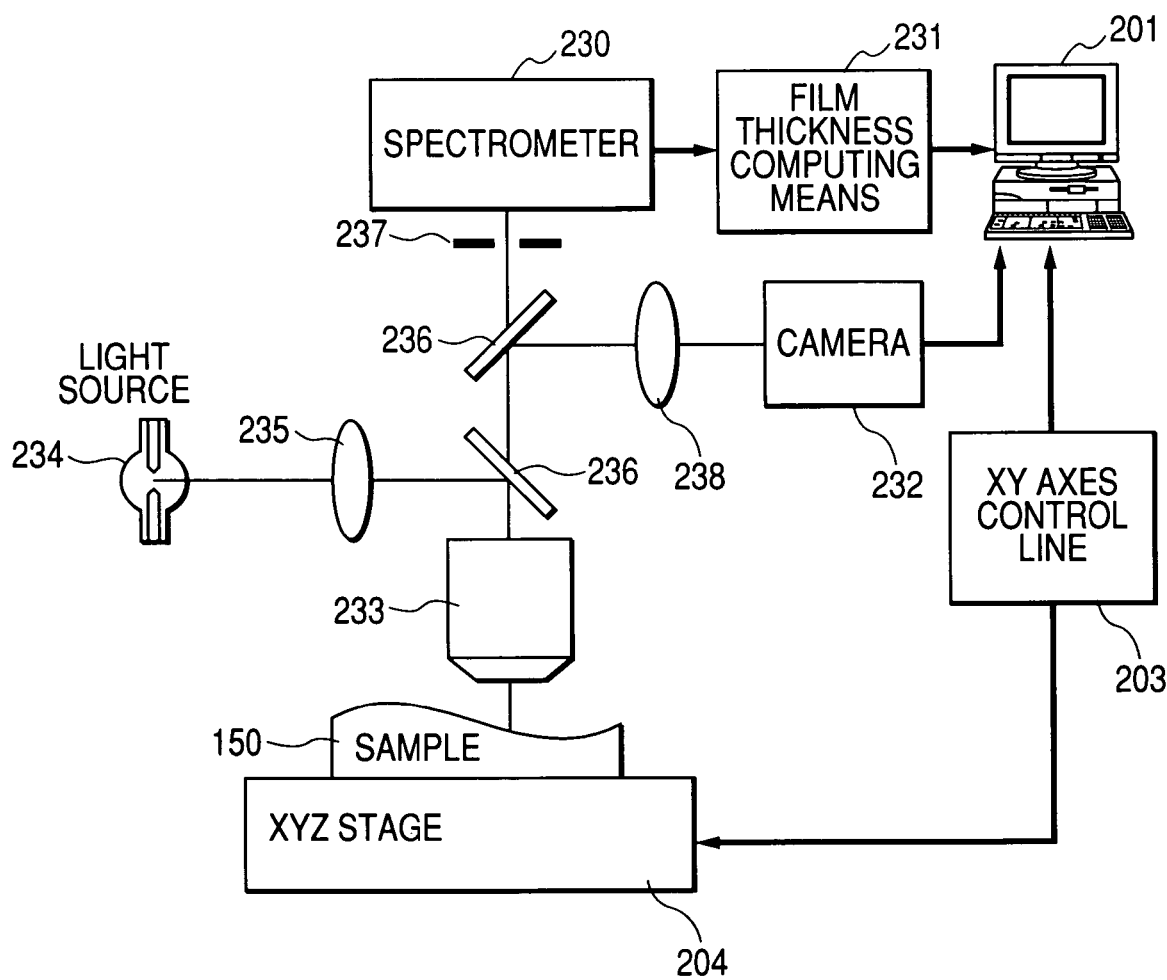
FIG. 10 shows a configuration of an optical film thickness measuring apparatus to be used in the invention.

Whereas resistance measuring means 210 is illustrated in FIG. 9, the result of its resistance measurement is stored at the same time as storing of the height profile by the Z axis control line 202, and accumulated in and displayed on the overall control system console 201 as resistance distribution data. The resistances can be measured at all the points when scanning the sample 150 and recorded as a resistance profile image, or measured data can as well be obtained only from the bottom holes, whose resistance measurements are particularly needed.

Figure 8:
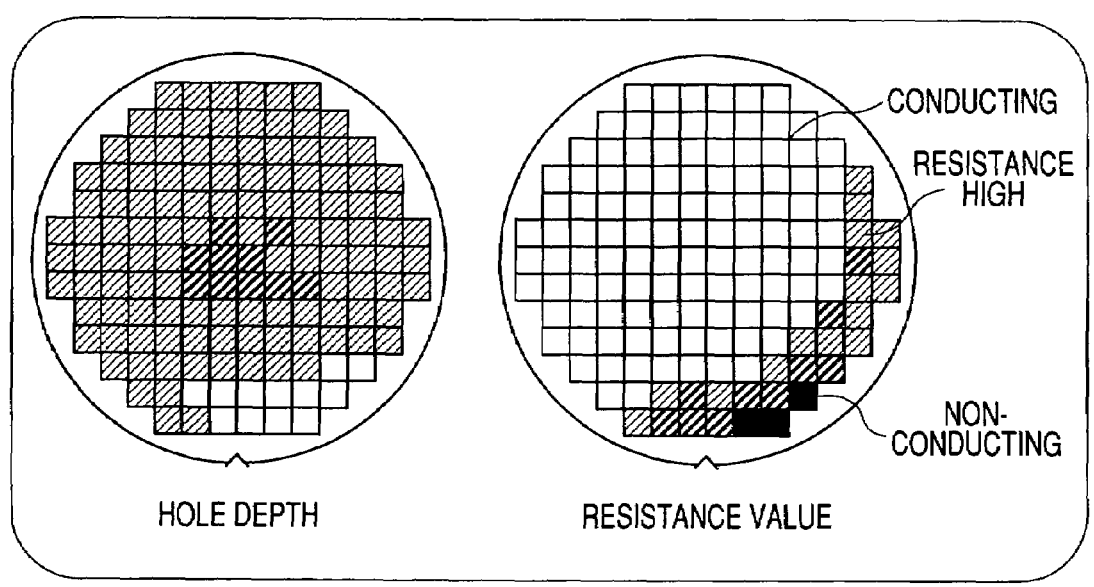
FIG. 8 is an example of GUI drawing regarding the measurement of the state of inter-layer connection hole etching by the combined use of measuring the hole depth and the film thickness, which constitutes Embodiment 3 of the invention.

Next, an example of displaying by the overall control system console 201 will be described with reference to FIG. 8. As shown in FIG. 8, the distribution of hole depths in the wafer and the distribution of resistances at the hole bottoms are expressed in darker and less dark images, respectively, and these images are displayed side by side for the convenience of comparison. This makes visually perceivable the distributions of hole depths and of the holes reaching and not reaching the wiring layer, which can be effectively utilized in correcting unevenness in the distribution of the etched quantity by altering the conditions of etching or adjusting the duration of etching not to let any insufficiently over-etched area occur.

To add, by further combining the methods described with reference to Embodiments 1, 2 and 3, even more reliable information can be obtained for use in establishing and confirming the process conditions.

Embodiment 4

Next, a method by which the invention is used in a manufacturing process of semiconductor devices will be described.

Figure 11:
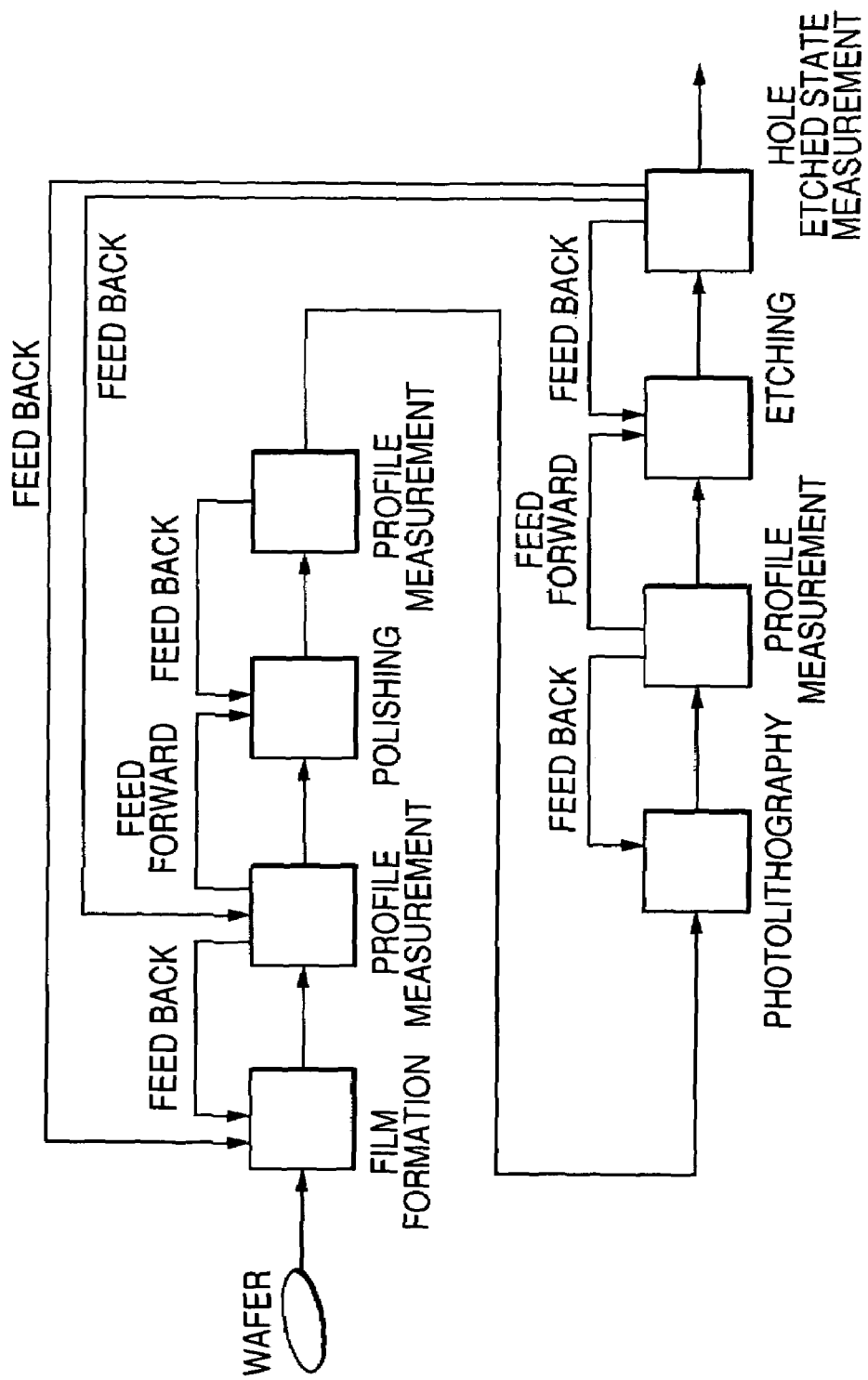
FIG. 11 illustrates the process feedback of the result of measuring the state of inter-layer connection hole etching, which constitutes Embodiment 4 of the invention.

FIG. 11 illustrates how the result of measuring the state of inter-layer connection hole etching is fed back to the process. A wafer is machined into a semiconductor device by repeating steps of film formation, polishing, photolithography (resist application, exposure to light and development) and etching.

Between these steps, the distributions of film thickness and sample height are measured according to the invention. The information obtained as a result is either fed back to the process conditions of preceding steps or fed forward to those of subsequent steps. In particular after the etching step, the etched states of holes are measured as described with reference to Embodiments 1 through 3, and the measured results can be fed back to the steps of film formation, polishing or etching.

Next, another example of configuration of stylus profiler for film thickness measurement or AFM measurement and the etcher and CMP (polishing) device will be described with reference to FIG. 12. A robot arm 421 loads a wafer from a wafer cassette 420, subjects it to machining by an etcher 410, and returns the machined wafer to the wafer cassette 420. Before or after this, measurement is performed with a film thickness measuring instrument 413, a stylus profiler or an AFM 400.

A CMP device 411 similarly causes the robot arm 421 to load a wafer from the wafer cassette 420, subjects it to machining by the CMP device 411, and returns the machined wafer to the wafer cassette 420. Before or after this, measurement is performed with the film thickness measuring instrument 413, the stylus profiler or the AFM 400. The measured data are collected into the data analyzing unit 430, compared and reflected in the processing conditions of the process device. By collecting data into a plurality of process devices and subjecting the data to analyses by the devices, feedback to the process conditions can be made more frequently and more accurately.

Embodiment 5

Next, one example of scanning method for use in the measurement of hole depths with a stylus profiler or an AFM will be described with reference to FIG. 13. These are planar perspective drawings of Embodiment 1 matching the sections shown in FIG. 1. The sample 150 has its wiring layer 101 underneath the insulator layer 100.

The hole patterns 102 are disposed over the patterns 101 of the wiring layer, and the dummy holes 103 are bored adjoining a hole pattern 102 where there is no adjacent wiring layer pattern 101. The hole depths are desired to be measured of one dummy hole 103 and one or a few (preferably two usually) of the adjacent holes 102.

Figure 13A:
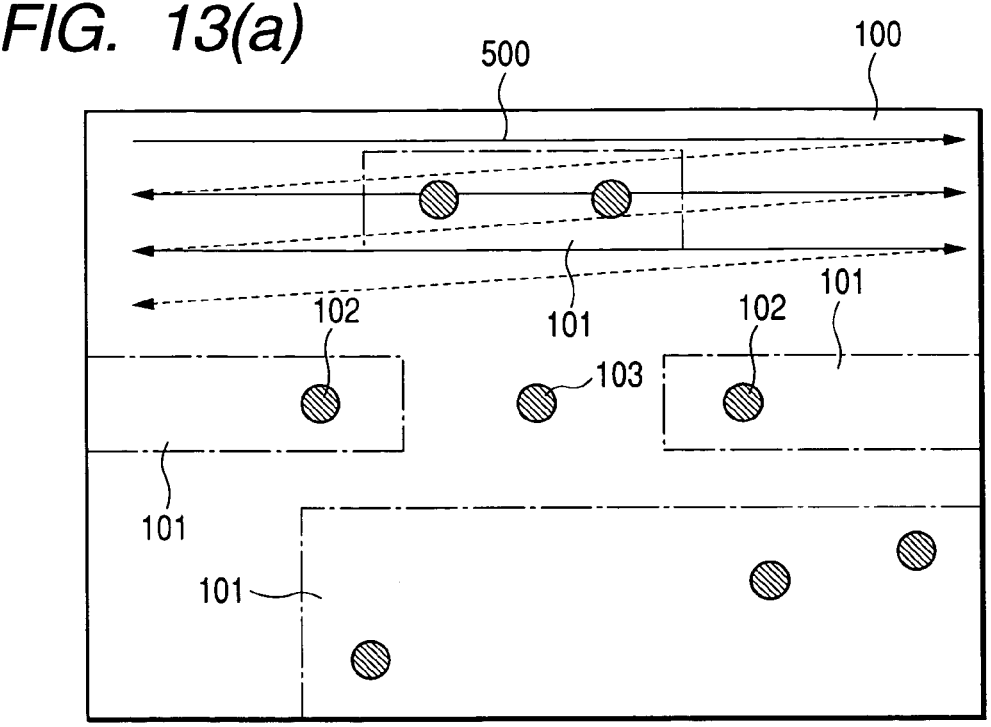
FIG. 13(a) shows a case of coarse scanning with the scanning pattern for hole depth measurement in Embodiment 5 of the invention and FIG. 13(b) shows a case of fine scanning in the same.
Figure 13B:
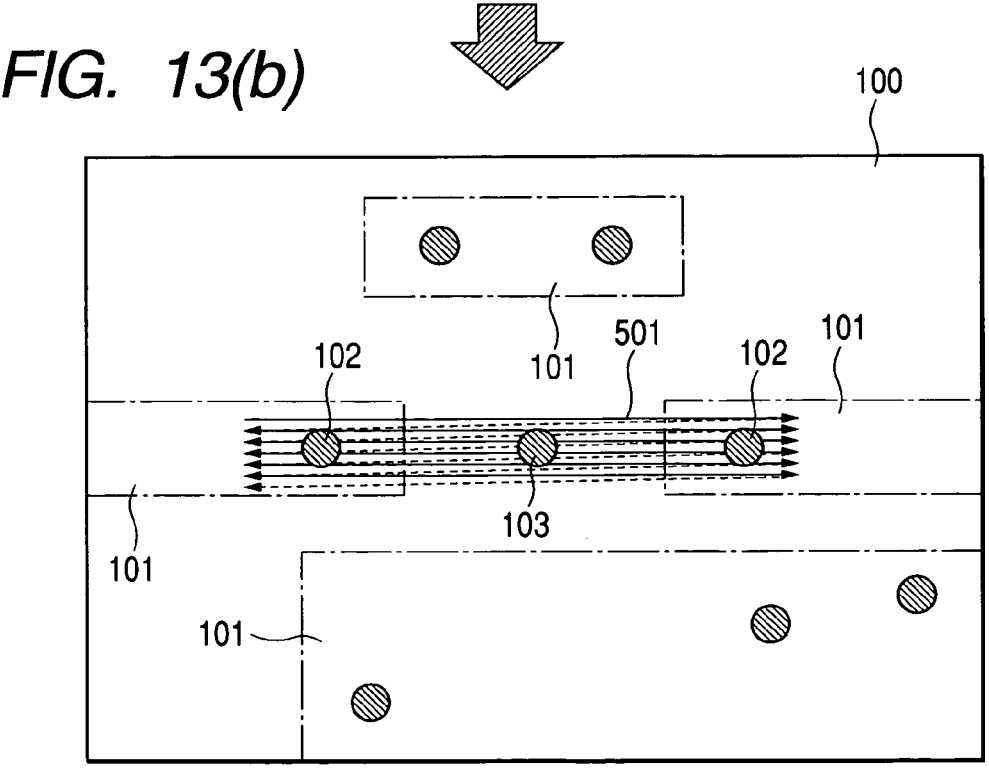

Whereas this area can be extracted by observation with a separate optical microscope or a scanning electron microscope (SEM), another applicable method is to roughly scan a wide field of view with a stylus profiler or an AFM as represented by a scanning locus 500 in FIG. 13(a), and the target pattern position is extracted from the scanned field of view to be finely scanned again as represented by another scanning locus 501 in FIG. 13(b).

Since only the positions of holes are desired to be located by the rough scanning in the scanning locus 500 as shown in FIG. 13(a) and their depths need not be known, high-speed poses no problem. In the fine scanning shown in FIG. 13(b), slow scanning is required to let the stylus reach the hole depth at least where there is a hole. The extraction of positions may be done either by direct watching or automatically by using an image processing technique.

Figure 14A:
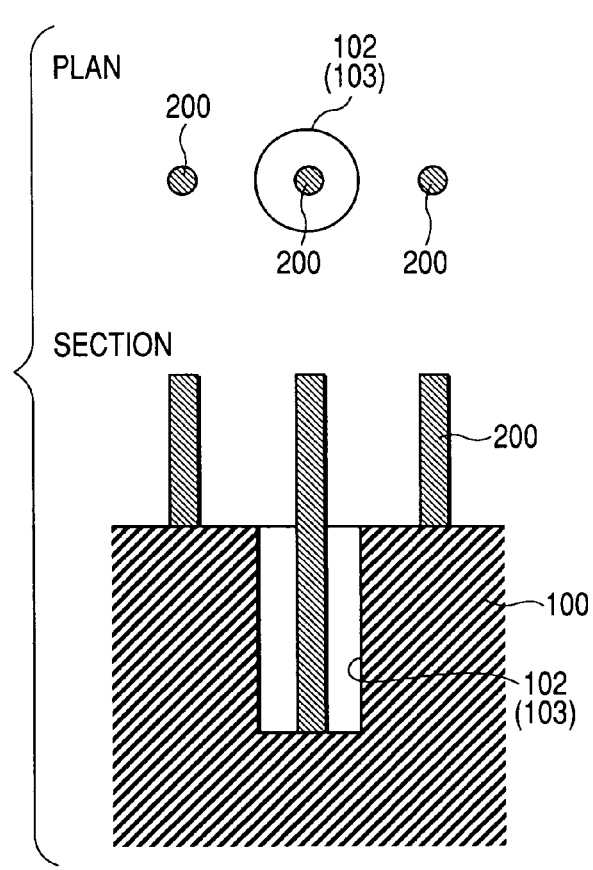
FIG. 14(a) shows a section of a pattern for illustrating a case in which the hole depth is measured at three points in Embodiment 5 of the invention and FIG. 14(b) shows a section of a pattern for illustrating a case in which the hole depth is measured by scanning a circle.
Figure 14B:
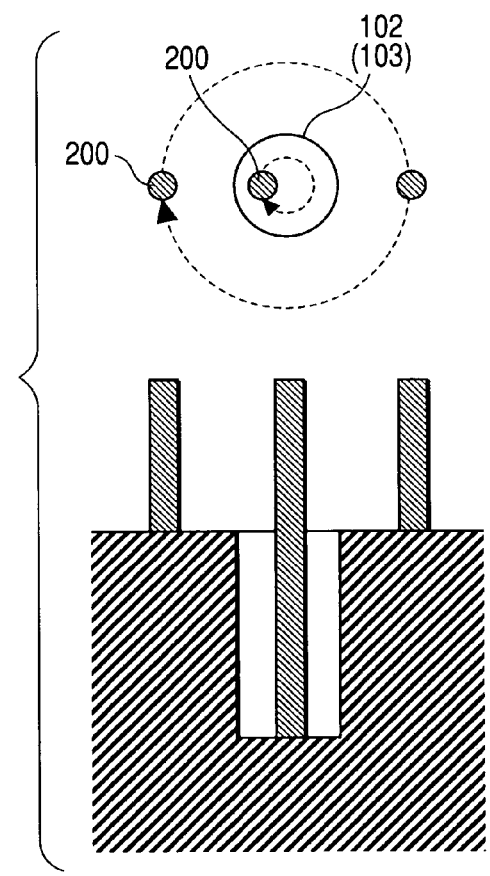

Another detailed scanning method will be described with reference to FIG. 14. By measuring with the stylus 200 the heights of three points including the right and left outside points and one inside a hole 102 (or a hole 103) as shown in FIG. 14(a), the depth of the hole can be determined from the differences among them. The number of points per hole is not limited to three, but at least one each outside and inside a hole can be measured, but the heights of a few points each outside and inside each hole can as well be measured to ensure greater accuracy. Alternatively, as shown in FIG. 14(b), the outer circumference of the hole can be scanned in a circle as indicated by the broken line, and the average height can be calculated. Similarly, the inner circumference of the hole can be scanned in a circle as indicated by the broken line, and the average height can be calculated. The embodiment so far described makes it possible to specify a measurement pattern and to accurately measure its depth.

Embodiment 6

Now, the exposure mask and the light exposure program (lithography data) according to the invention touched upon in the earlier description of Embodiment 1 will be described in more detail. The exposure mask and the lithography data according to the invention is formed of a pair of the exposure mask or lithography data including the wiring pattern shown in FIG. 15(a) and the exposure mask or lithography data including the conduction pattern shown in FIG. 15(b).

As stated above, reference numeral 101 denotes the wiring pattern and 102, the conduction pattern. The pattern 101 represented by the one-dot chain line in FIG. 15(b) is shown for positional reference, but not an actually existent pattern. These exposure mask or lithography data are transferred onto the wafer 150 by a projection exposure device of FIG. 16 or a direct drawing device of FIG. 17, and formed by a known etching technique.

Figure 15A:
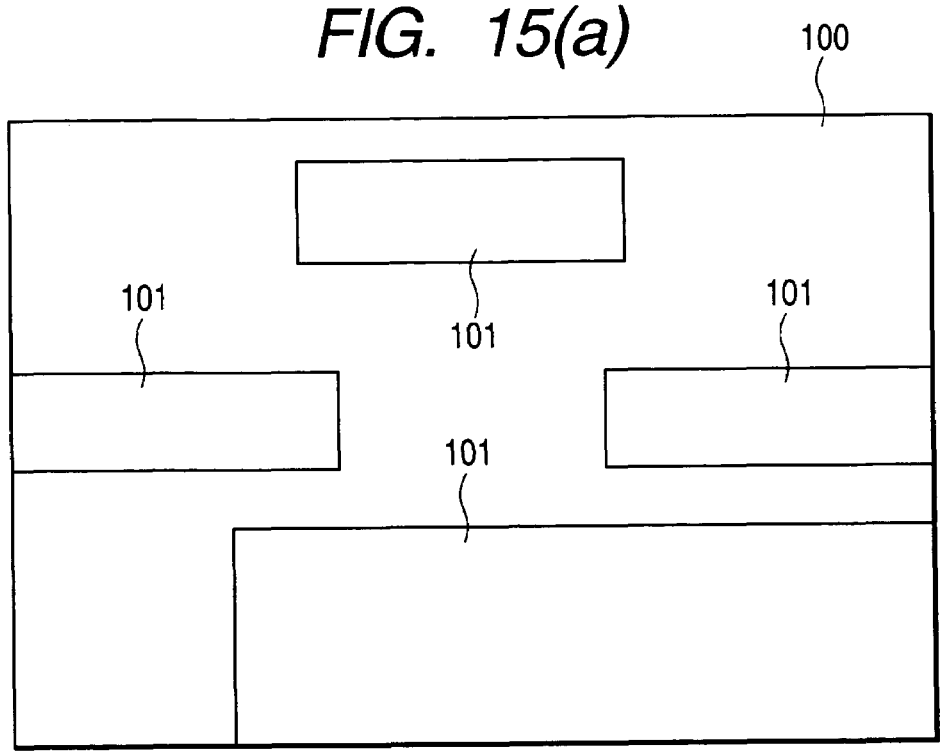
FIG. 15(a) shows a plan of an exposure pattern including a wiring pattern in Embodiment 6 of the invention and FIG. 15(b) shows a plan of an exposure pattern including a conduction pattern.
Figure 15B:
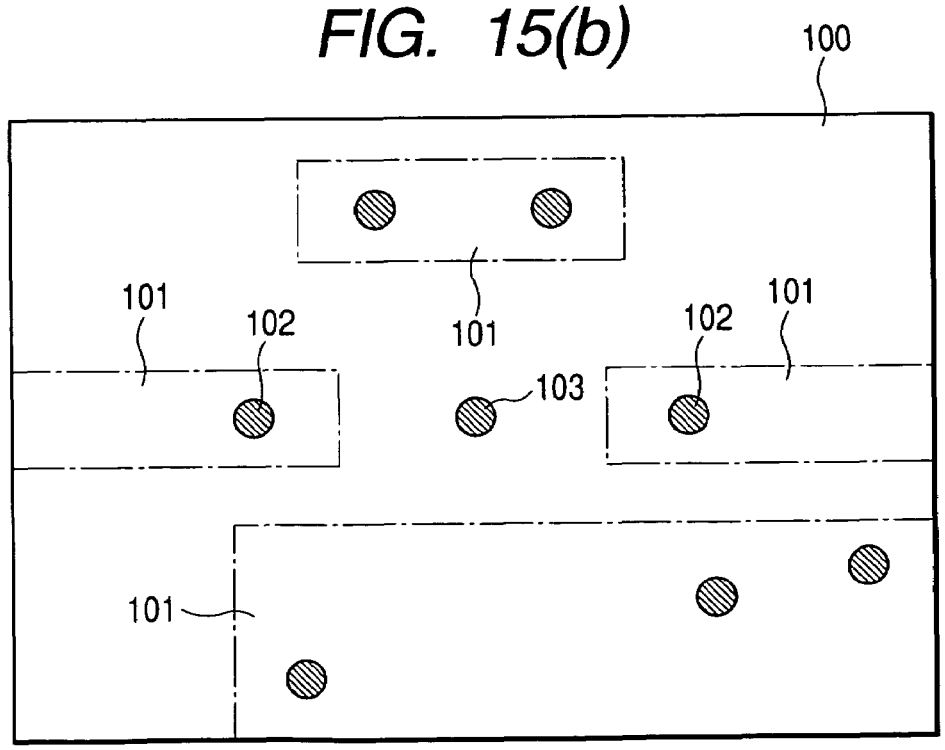

After forming a pattern over the wafer by using the exposure mask and the lithography data including the wiring pattern shown in FIG. 15(a), a pattern is formed by using the exposure mask or the lithography data including the conduction pattern as shown in FIG. 15(b). By measuring this pattern by any of the methods described with reference to Embodiments 1 through 5, the relative quality of the etched state can be confirmed.

Figure 16:
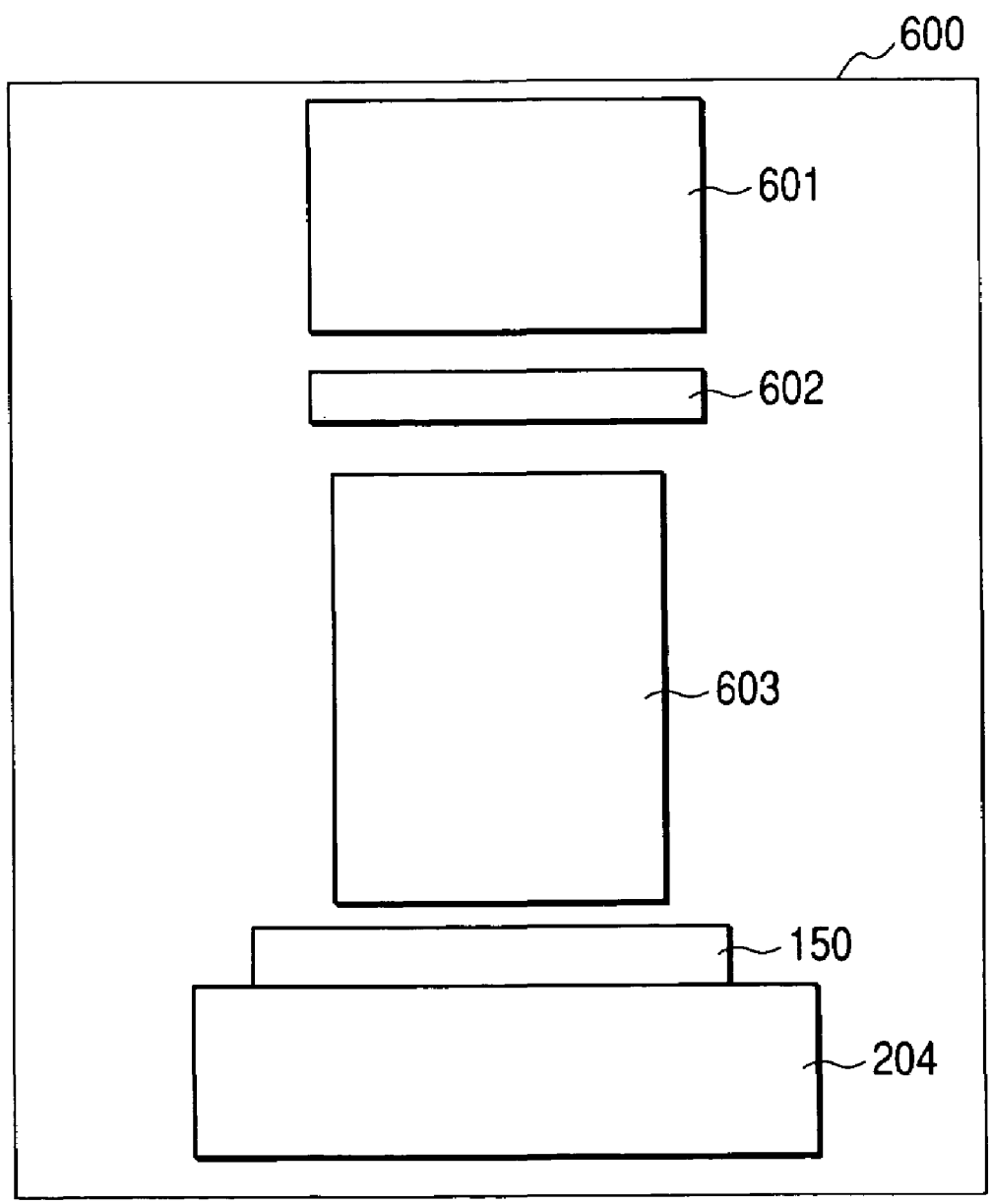
FIG. 16 is a front view showing a schematic configuration of a projection exposure device to be used in the invention.

A projection exposure device 600 shown in FIG. 16 irradiates an exposure mask 602 with a beam from a light source 601 formed of a visible light source, ultraviolet ray source, electron beam source of X-ray source, and projects the resultant image onto the sample wafer 150 mounted on a stage 204 with a projection optical system 603. The sample 150 is coated with a photoresist, and the pattern of the resist is formed by developing the project image. Or where the exposure mask 602 and the sample 150 are brought close to each to directly transfer the pattern, obviously the invention can also serve its purpose.

Figure 17:
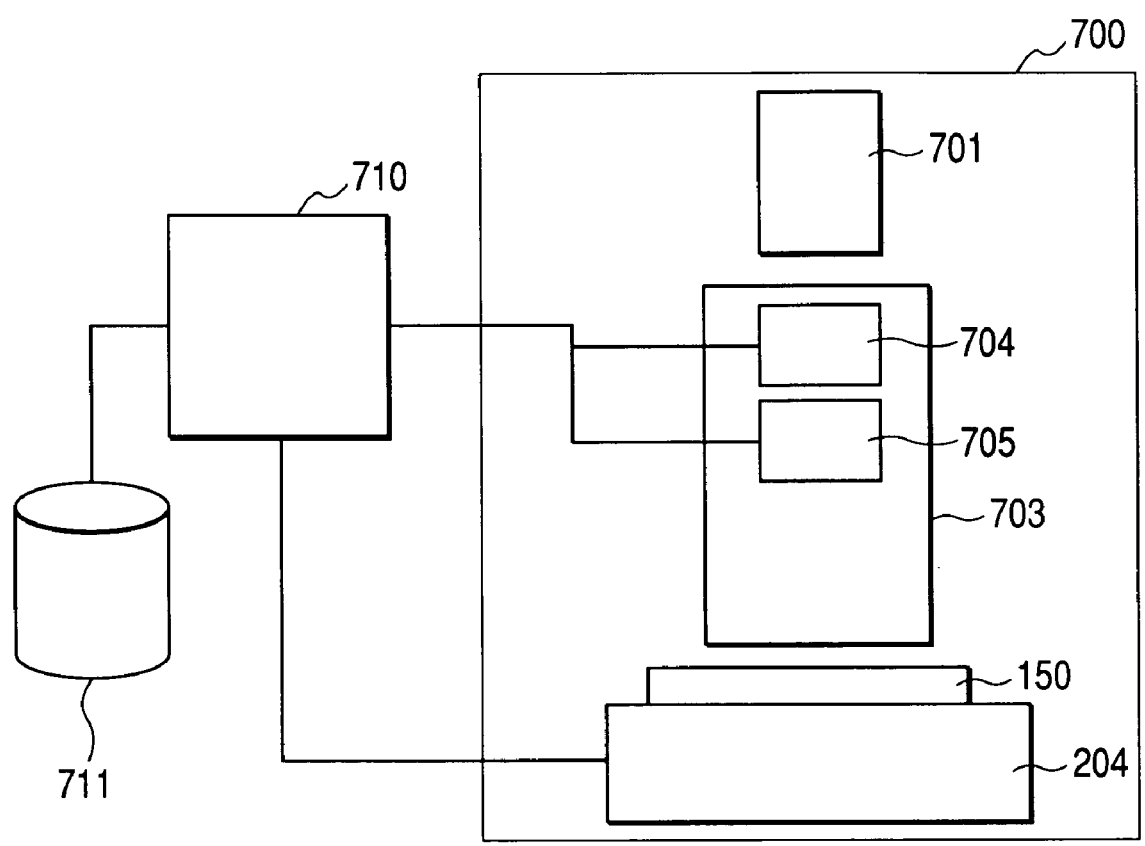
FIG. 17 is a front view showing a schematic configuration of direct drawing device to be used in the invention.

A direct drawing device 700 shown in FIG. 17 forms a pattern by projecting a beam (not shown) emitted from a light source 701 formed of a laser beam source or an electron beam source with an optical system 703 including blanking means 704 and deflecting means 705 onto the sample 150 mounted on the stage 204. Control means 710 generates from the exposure program (lithography data) stored in design data storing means 711 control signals to be given to the blanking means 704, deflecting means 705 and the sample mounting stage 204, and can thereby form a pattern according to the exposure program (lithography data) stored in the design data storing means 711 by projecting the pattern on the sample 150 with an electron beam or a laser beam.

By forming a pattern on a wafer with a projection exposure device or a direct drawing device according to the exposure mask or lithography data including the pattern shown in FIG. 15 as described above and measuring this pattern by any of the methods described with reference to Embodiments 1 through 5, the relative quality of the etched state can be confirmed.

To add, obviously the invention can be effectively applied not only the fabrication of semiconductor devices but also to the manufacturing of electronic components requiring a fine patterning process, such as thin film magnetic heads and liquid crystal display units.

In the process of etching holes for inter-layer connection which is becoming increasingly difficult as the patterns become ever finer in the manufacturing of electronic components including semiconductor devices, it is made possible to quantitatively evaluate the etched state in a nondestructive way. Thus the invention is useful in establishing the conditions for etching and in QC checkups, and can contribute to enhancing the yield of electronic component production.

The invention may be embodied in other specific forms without departing from the spirit or essential characteristics thereof. The embodiments described above therefore are to be considered in all respects as illustrative but not restrictive, the scope of the invention being indicated by the appended claims rather than by the foregoing description, and all changes which come within the meaning and range of equivalency of the claims are therefore intended to be embraced therein.

What is claimed is:

1. A method of measuring an amount of over-etching of a hole on a sample, comprising the steps of:

acquiring height profile information of the sample, having hole patterns formed in an insulator layer thereof, on a plurality of hole patterns by scanning with a sytlus on the surface of the sample in which the hole patterns are formed by etching: and measuring the depths of said hole patterns on the bottom faces of hole patterns and in the respective vicinities of said hole patterns on the basis of said height profile information;

wherein said hole patterns include a regular hole formed in the insulator layer located on a stopper layer having smaller etching rate compared to said insulator layer and a dummy hole formed in the insulator layer adjoining said regular hole where there is no stopper layer and both said regular hole and said dummy hole are formed together in an etching process further comprising a step of calculating an over-etching amount of said regular hole using measured depths both of said regular hole and said dummy hole and etching rates both of said insulator layer and said stopper layer.

2. The method of measuring an amount of over-etching of a hole on a sample according to claim 1, further comprising a step of displaying, on a screen, measuring depths and calculated over-etching amounts of regular holes, respectively, according to a positional information of each of The regular holes.

3. The method of measuring an amount of over-etching of a hole on a sample according to claim 1, wherein said stopper layer is a wiring layer.

4. The method of measuring an amount of over-etching of a hole on a sample according to claim 1, further comprising steps of:

measuring resistance of the insulator layer inside the regular holes by applying a voltage between the stylus and the stopper layer, and displaying on a screen, measured depths and resistances of residual insulator layer of regular holes, respectively, according to a positional information on each of the regular holes.

* * * * *